United States Patent Office 3,166,506
Patented Jan. 19, 1965

3,166,506
HIGH TEMPERATURE GREASE
Stephen J. Zajac, Whiting, Ind., assignor to Standard Oil Company, Chicago, Ill., a corporation of Indiana
No Drawing. Filed Feb. 21, 1962, Ser. No. 175,871
4 Claims. (Cl. 252—49.6)

This invention relates to lubricant greases and more particularly concerns a novel thickener for such greases.

I have now discovered that greases possessing outstanding properties with respect to high temperature stability and mechanical stability may be prepared with a lubricant base thickened to grease consistency with a reaction product of an aromatic polyisocyanate and a boric acid. The reaction product is apparently a polymer, or perhaps a telomer, of the aromatic polyisocyanate, and contains only a few thousandths of 1% boron.

Aromatic polyisocyanates are those molecules containing one or more aromatic nuclei and two or more isocyanate groups; those having two isocyanate groups are preferred. Among the suitable aromatic polyisocyanates are those having a biphenylene structure as shown below:

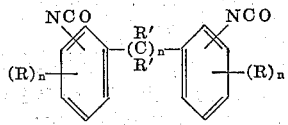

Examples of biphenylene diisocyanates are bitolylene diisocyanate (3,3'-bitolylene-4,4'-diisocyanate), diphenylmethane-4,4'-diisocyanate, 3,3'-dimethyldiphenylmethane-4,4'-diisocyanate, xenylene diisocyanate, diphenylxenylene diisocyanate, and substituted derivatives thereof such as dianisidine diisocyanate and dichloroxenylene diisocyanate. Thus in the foregoing formula $n$ is an integer of 0–4, R is an alkyl group of 1–4 carbon atoms or a phenyl group, and R' is hydrogen or an alkyl group of 1–4 carbon atoms.

Other highly desirable forms of aromatic polyisocyanate are the monophenylene diisocyanates represented by, for example, compounds within the formula below:

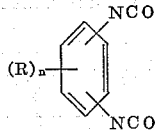

In the above formula $n$ is 0–4 and R is an alkyl group of 1–4 carbon atoms. Examples of monophenylene diisocyanates are tolylene diisocyanate (either the 65 percent 2,4 isomer and 35 percent 2,6 isomer, the 80 percent 2,4 isomer and 20 percent 2,6 isomer, or the 100 percent 2,4 isomer), meta phenylene diisocyanate, 2,4-tolylene diisocyanate dimer, and xylylene diisocyanate. Non-hydrocarbon substituted monophenylene diisocyanates include methoxyphenylene diisocyanate, phenoxyphenylene diisocyanate, and chlorophenylene diisocyanate.

Other aromatic polyisocyanates also suitable for use herewith include triphenylmethane triisocyanate, naphthalene diisocyanate, and methyl naphthalene diisocyanate.

Apparently any form of boric acid may be used. I prefer $H_3BO_3$, although materials which afford $H_3BO_3$, such as boric anhydride, $HBO_2$, and the various boric acid esters, e.g. $MeH_2BO_3$ may also be employed.

Only a small amount of a boric acid is necessary for the reaction. I have used as little as 2% and as much as 20%, with substantially equivalent results being obtained in each case. Accordingly, the amount of boric acid may range from as little as 0.01 weight percent or less to as much as 50 weight percent or more, with only a slight increase in boron content of the reaction product obtained at the extreme high limit of the foregoing range.

The reaction between the aromatic polyisocyanate and the boric acid is advantageously conducted at a temperature within the range of about 100–300° F., preferably about 150–225° F., e.g. 180–210° F. An inert solvent—that is a liquid which does not deleteriously affect the reaction or reaction product—is advantageously employed; I prefer to use dimethylformamide as it is an excellent solvent for both reactants, although such diverse materials as ethyl acetate, dialkyl esters of the ethylene glycols, such as dibutyl Carbitol, and even high boiling hydrocarbons appear to be useful.

In preparing the inventive composition, I prefer to add the polyisocyanate, the boric acid, and the dimethylformamide to a heated vessel, which is stirred and heated to a temperature within the range of about 180–200° F. Crystals of the inventive reaction product begin to form immediately when the temperature reaches about 200° F. I then prefer to maintain the foregoing temperature range for about 5 minutes and then cut off all heat without agitation, and permit the mixture to cool without extraneous coolants for about 2 hours. A mild bubbling takes place during the first hour or so.

After about 2 hours of cooling and crystallization, well-formed crystals are present. The mixture is then preferably mixed with water to wash the newly formed crystals, and then vacuum filtered to remove dimethylformamide and water. To assure good washing, I wash and filter several times and then dry the solids at 210–220° F.

The solids are particularly useful as grease thickeners as they can be stored in dry or moist condition and added to the oleaginous lubricant base at room temperature. For such addition, a sufficient quantity of thickener, e.g. 1–20 percent, 2–20%, preferably about 4–10% by weight, is added to the appropriate lubricant vehicle or base and stirred at room temperature. When the mix is uniform, it is roll milled or homogenized by conventional means to assure intimate dispersion of the thickener.

Lubricant vehicles are lubricant bases which can be thickened with the herein described reaction products to form greases and illustratively include the silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" and the trifluorochloroethylene polymers known as "Kel-F," and other lubricant vehicles.

The silicone polymer oils which may be employed in conjunction with the present invention are those falling substantially within the lubricating oil viscosity range, e.g. possessing a viscosity at 100° F. within the range of about 25 to about 3500 SSU. These silicone oils are polyalkyl or polyalkaryl siloxanes such as methyl siloxane or methyl phenyl siloxane. Mineral oils in the lubricating oil viscosity range, e.g. from about 50 SSU at 100° F. to about 300 SSU at 210° F., and preferably solvent extracted to substantially remove the low viscosity index constituents, also suitable. Similarly, synthetic lubricating oils resulting from polymerization of unsaturated hydrocarbons or other oleaginous materials within the lubricating oil viscosity range such as high molecular weight polyoxyalkylene compounds typified by polyalkylene glycols and esters thereof, aliphatic diesters of dicarboxylic acids such as the butyl, hexyl, 2-ethylhexyl, decyl, lauryl, etc., esters of sebacic acid, adipic acid, azelaic acid, etc. may be thickened to produce excellent greases. Polyfluoro derivatives of organic compounds, particularly hydrocarbons, and dibasic acid esters of $H(CF_2)_nCH_2OH$, in the lubricating oil viscosity range can also be thickened. Other synthetic oils, such as esters of aliphatic carboxylic acids and polyhydric alcohol, e.g. trimethylolpropane tripelargonate and pentaerythritol hexanoate, can be used as suitable oil vehicles. Where the grease product is to be employed under high temperature conditions, e.g. above 400° F., lubricating oil vehicles which are stable, i.e. do not decompose at the temperatures to be encountered, should be used as the vehicle. For such uses, silicone polymers and diesters of dicarboxylic acids are preferred.

The invention will be exemplified in the following examples. It is to be understood that these are for illustrative purposes only and are not to be considered wholly definitive and exclusive with respect to scope or conditions.

EXAMPLE

In this example several reaction products are prepared from bitolylene diisocyanate and boric acid in dimethylformamide. In each case, all of the isocyanate, boric acid, and solvent are stirred and heated together at 180–200° F. for 5 minutes, after which both heat and agitation are withdrawn and the mixture permitted to crystallize. After appropriate washing, vacuum filtering, and drying as described above, the reaction product is available in hand.

Table No. 1 below illustrates various proportions tested:

*Table No. 1*

| Mix No. | 1 | 2 | 3 | 4 |
|---|---|---|---|---|
| Bitolylene Diisocyanate, grams | 80.9 | 90.4 | 97.61 | 95.25 |
| Boric Acid, grams | 19.1 | 9.6 | 2.39 | 4.75 |
| N,N-Dimethylformamide, cc | 600 | 600 | 600 | 500 |

In the table below, Table No. 2, are grease formulations prepared from Mixes 1, 2 and 3 of Table No. 1:

*Table No. 2*

| Mix No. | 5 | 6 | 7 |
|---|---|---|---|
| Thickener No. 1 from Table No. 1 | 22 | | |
| Thickener No. 2 from Table No. 1 | | 22 | |
| Thickener No. 3 from Table No. 1 | | | 22 |
| DC-550 Silicone Oil [1] | 78 | 78 | 78 |
| Unworked Penetration | 288 | 239 | 251 |
| Worked Penetration | 288 | 239 | 247 |

[1] Methyl phenyl silicone.

Mixes 2 and 3 were analyzed by the emission spectroscope for boron; Mix 2 contained 0.060% boron while Mix 3 contained 0.014% boron (the percentages, of course, are on a lubricant-free basis).

In Table No. 3 below are greases prepared from Mix 4 of Table No. 1:

*Table No. 3*

| Mix No. | 8 | 9 | 10 | 11 |
|---|---|---|---|---|
| Thickener, percent | 22 | 20 | 18 | 22 |
| DC-550 Silicone Oil, percent | 78 | 80 | 82 | |
| Hercoflex 600 Oil,[1] percent | | | | 78 |
| Unworked Penetration | 231 | 260 | 284 | 288 |
| Worked Penetration | 231 | 264 | 284 | 288 |
| Drop Point, ° F. + | 450 | 450 | 450 | 450 |
| 10,000 r.p.m. Bearing Test at 450° F., hours | | 641 | | |

[1] $C_6$ Fatty acid ester of pentaerythritol.

Mix 9 of Table No. 3 was tested in the High Speed Bearing Test, CRC Designation L-35-59, at 450° F. The test bearings are SAE No. 204 size ball bearings, and a test run of 200 hours is considered adequate. The outstanding performance of the inventive grease, 641 hours, is clearly manifested.

Thus it is evident that there has been prepared, in accordance with the invention, an outstanding grease thickener. It may be employed in virtually any type of lubricant base, either alone or in admixture with other lubricant additives such as antirusts, corrosion and oxidation inhibitors.

While the invention has been described in conjunction with specific examples thereof, it will be evident that many alternatives, modifications, and variations will be apparent to those skilled in the art in view of my description. Accordingly, it is intended to embrace all such alternatives, modifications, and variations as fall within the spirit and broad scope of the appended claims:

What I claim is:

1. A lubricant grease composition comprising an oleaginous lubricant base thickened to grease consistency with a reaction product of an aromatic polyisocyanate and from 0.01 weight percent to 50 weight percent based on aromatic polyisocyanate of a boric acid, said reaction having been conducted at a temperature within the range of about 100–300° F. for a period up to about two hours.

2. The grease of claim 1 wherein said aromatic polyisocyanate is a biphenylene diisocyanate.

3. The grease of claim 2 wherein said biphenylene diisocyanate is bitolylene diisocyanate.

4. The grease of claim 1 wherein said reaction product is present at a concentration of about 1–20 weight percent.

References Cited in the file of this patent

UNITED STATES PATENTS

| 2,931,831 | Aries | Apr. 5, 1960 |
| 2,945,841 | Aries | July 19, 1960 |